United States Patent [19]
Coty

[11] 3,865,221
[45] Dec. 17, 1974

[54] VISCOUS FLUID CLUTCH
[76] Inventor: Donald J. Coty, Kettering, Ohio
[73] Assignee: General Motors Corp., Detroit, Mich.
[22] Filed: Jan. 9, 1974
[21] Appl. No.: 431,918

[52] U.S. Cl............. 192/58 B, 29/156.4 R, 29/405, 29/513, 192/82 T
[51] Int. Cl....................... F16d 35/00, B21d 39/00
[58] Field of Search...................... 192/58 B, 82 T; 29/156.4 R, 405, 513

[56] References Cited
UNITED STATES PATENTS
| | | | |
|---|---|---|---|
| 3,061,338 | 10/1962 | Clark | 29/513 X |
| 3,463,282 | 8/1969 | Fujita et al. | 192/58 B |
| 3,587,801 | 6/1971 | Riner | 192/58 B |
| 3,630,331 | 12/1971 | Bradbury | 192/58 B |
| 3,661,235 | 5/1972 | Harrison | 29/513 X |

Primary Examiner—Allan D. Herrmann
Attorney, Agent, or Firm—John P. Moran

[57] ABSTRACT

A method of assembling the cover member and pump plate member of a viscous fluid clutch when the members are formed of dissimilar material.

4 Claims, 5 Drawing Figures

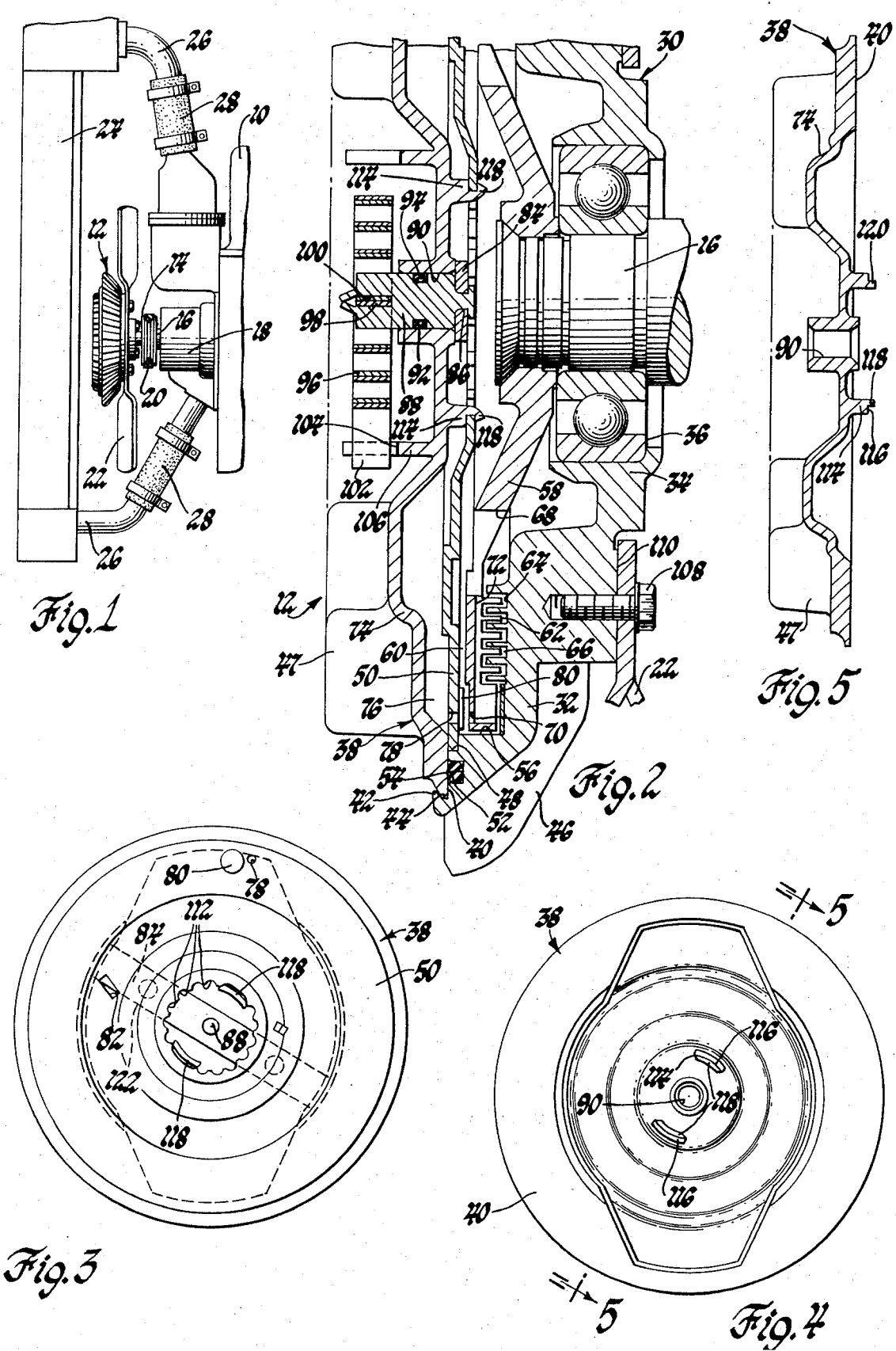

3,865,221

VISCOUS FLUID CLUTCH

This invention relates generally to viscous fluid clutches and, more particularly, to a method of assembly for selected components thereof.

Generally, the cover member and pump plate member of a viscous fluid clutch are formed of the same material and spot-welded together in a predetermined circumferential relationship prior to final assembly on the clutch body. At times, it may be desirable from a heat-dissipation standpoint, or for other reasons, to utilize a cover member and associated pump plate of dissimilar material, for example, aluminum and steel, respectively. For such an operation, the above-mentioned spot-welding operation is not satisfactory.

Accordingly, an object of the invention is to provide an improved method of assembly, suitable for joining the cover and pump plate members of a viscous fluid clutch when such members are formed of dissimilar materials.

Another object of the invention is to provide an improved staking method of joining the cover and pump plate members of a viscous fluid clutch when said cover member is formed of a soft material and said pump plate member is formed of a harder material.

A further object of the invention is to provide a method of staking a viscous fluid clutch steel pump plate to an aluminum clutch cover member, wherein oppositely disposed axial shoulders and associated arcuate-shaped projections ae formed on a face of the cover member, while a pluralilty of closely adjacent arcuate-shaped notches are formed around the inner peripheral edge of the pump plate, the pump plate being mounted on the axial shoulders such that the projections extend through the notched opening closely adjacent the edge thereof. Once the pump plate is selectively circumferentially positioned on the cover member, the projections are staked radially outwardly to become wedged into the adjacent notches so as to be able to withstand a turning torque of a predetermined force.

These and other objects and advantages of the invention will be apparent when reference is made to the following description and accompanying drawings, wherein:

FIG. 1 is a fragmentary side elevational view of a radiator and engine having a viscous fluid clutch-driven cooling fan associated therewith;

FIG. 2 is an enlarged fragmentary cross-sectional view of a viscous fluid, shear-type clutch with elements thereof assembled by the inventive method;

FIG. 3 is a plan view illustrating the elements involved in the inventive method and the assembled relationship therebetween;

FIG. 4 is a plan view of one of the elements of FIG. 3 in its preassembled state; and FIG. 5 is a cross-sectional view taken along the plane of line 5—5 of FIG. 4, and looking in the direction of the arrows.

Referring to the drawings in greater detail, FIG. 1 illustrates an engine 10 having a viscous fluid clutch 12 and a pulley 14 mounted on a drive shaft 16 extending from the conventional water pump 18, the pulley 14 being rotated by a V-belt 20 connected to the crankshaft (not shown) for driving a cooling fan 22 secured to the clutch 12. The fluid clutch 12 and the cooling fan 22 are located between the engine 10 and a radiator 24. The usual conduits 26 and associated hoses 28 communicate between the radiator 24 and the engine 10 adjacent the water pump 18.

Referring now to FIG. 2, the fluid clutch 12 includes a housing or output member 30 which includes a rear wall member 32 having a hub 34 which is rotatably mounted by a suitable bearing 36 on the drive shaft 16. The housing 30 further includes a cover or front wall member 38 which has an annular flat surface 40 formed adjacent its peripheral edge, the latter being confined by an annular lip 42 in an annular recess 44 formed in the housing 30. Cooling fins 46 and 47 are formed on the outer surfaces of the rear wall member 32 and the cover member 38, respectively. A second annular recess 48 is formed in the rear wall member 32 radially inward of the outer periphery of the first annular recess 44. A divider wall or pump plate 50 is mounted with its outer edge extending into the recess 48 intermediate the cover member 38 and the rear wall member 32. A seal 52 is compressed by the flat surface 40 of the cover member 38 in an annular groove 54 formed in the rear wall member 32 intermediate the outer edges of the annular recesses 44 and 48. A third annular deeper recess 56 is formed in the rear wall member 32 radially inward of the second annular recess 48. A clutch plate 58 is secured at its center by any suitable means to the drive shaft 16, the outer peripheral portion thereof being freely located in an operating or working chamber 60 formed by the third annular recess 56.

Adjacent portions of the clutch plate 58 and the rear wall member 32 are provided with torque-transmitting elements consisting of cooperating annular ridge and groove elements 62 and 64, respectively, with an intervening fluid shear space 66 therebetween to accommodate a suitable viscous fluid, such as silicone, as a torque-transmitting medium.

The clutch plate 58 further includes a plurality of equispaced openings 68 formed therein at a point radially inward from the ridge and groove elements 62 and 64. A pair of oppositely disposed smaller openings 70 are formed in the clutch plate 58 adjacent the outermost edge thereof. A pair of radial grooves, such as V-shaped grooves 72, are formed in the clutch plate 58 across the ridges 62 and terminating at the openings 68. The grooves 72 assist in the processes of filling and removing the fluid medium operative in the working chamber 60.

The front wall or cover member 38 includes a contoured portion 74 intermediate the center and peripheral edge thereof which forms an annular reservoir 76 with the pump plate 50. One or more pump outlet openings 78 are formed through the pump plate 50 circumferentially adjacent pump or dam elements 80 formed on the pump plate 50, the opening 78 communicating between the working chamber 60 and the annular reservoir 76. The pump element 80 may consist of a circular boss formed on the pump plate 50 by any suitable means, such as stamping, or it may be a rectangular-shaped or other-shaped member secured to the pump plate 50, such as by welding. In some applications one outlet and one pump element may be sufficient, while other applications may require two such pumping arrangements.

One or more inlet ports 82 (FIG. 3) are also formed in the pump plate 50, communicating between the annular reservoir 76 and the working chamber 60 radially inward of the pump elements 80 and the pump outlet openings 78.

The inlet port 82 is at times closed off by a valve member 84, which is normally responsive to temperature changes but which may be made responsive to centrifugal force. The valve member 84 is illustrated as being secured in any suitable manner to a reduced-diameter portion 86 of a center pin or shaft 88, which is rotatably mounted in a central opening 90 formed in the front wall or cover member 38. A seal ring 92 may be mounted in an annular groove 94 formed in the pin 88 within the central opening 90 to prevent leakage therepast. A suitable bimetallic thermostatic valve control element 96 is provided with an inwardly extending end-portion 98 which is mounted in a transverse slot 100 formed in the pin 88. An outwardly extending end-portion 102 of the bimetallic element 96 is restrained by virtue of being inserted in a slot 104 formed in a post 106. With this arrangement, a change in ambient temperature either winds or unwinds the bimetallic element 96 shown, resulting in rotation of the pin 88 and the valve member 84, to thus control the flow of fluid medium from the reservoir 76 through the inlet port 82 to the working chamber 60.

As is well known to those skilled in the fluid clutch art, upon rotation of the clutch plate 58 by the input shaft 16, via the pulley 14, torque is transmitted to the adjacent housing or output member 30 by the shear action of the fluid medium in the working chamber 60. Rotation of the output member of housing 30 effects rotation of the cooling fan 22 secured by bolts 108 to a mounting surface 110 formed on the housing 30, the speed thereof being influenced by the shear drive of the variable volume of fluid medium in the chamber 60.

The latter chamber 60 is substantially emptied by virtue of the fluid medium being pumped through the continuously open pump outlet opening 78 by the action of the pump element 80 serving as a dam or wiper, forcing the fluid to flow into the opening 78 and, thence, into the annular reservoir 76. Under this condition, commonly known as the "disengaged mode," the slip between the clutch plate 58 and the housing 30 is greatest, and fan 22 speed is correspondingly low.

Once ambient temperature increases to a predetermined level, the bimetallic thermostatic valve control element 96 unwinds, progressively uncovering the inlet port 82 in the pump plate 50, permitting the fluid to flow through the port 82 back into the working chamber 60 until the annular levels in both the working chamber 60 and the reservoir chamber 76 are at the same level, at which time the housing 30 and, hence, the fan 22 rotate at a minimal slip-speed with respect to the clutch plate 58, thereby effecting a so-called "engaged mode" or maximum cooling function.

So long as the inlet port 82 in the pump plate 50 remains open, a fluid circulation process will prevail, i.e, the rotating pump or dam elements 80 will continue to promote the flow of fluid from the working chamber 60 through the pump outlet openings 78 into the annular reservoir 76, from whence it will return to the working chamber 60 via the open inlet ports 82.

While the above represents typical viscous fluid clutch elements and a typical operation thereof, generally, the cover member 38 and the pump plate 50 are formed of the same material and spot-welded together prior to assembly on the housing 30, as was mentioned above. Insofar as the novel features of the present viscous fluid clutch 10 are concerned, it must be realized that, at times, it may be desirable for heat-dissipation purposes or other reasons to utilize a cover member and pump plate of dissimilar materials, for example, aluminum and steel, respectively. For such a combination, the above-mentioned spot-welding operation is not satisfactory.

Reference should now be made to FIG. 3, wherein it is noted that a plurality of closely adjacent arcuate-shaped notches 112, each of a predetermined uniform radius, are formed around the inner peripheral edge of the pump plate 50. It is also noted in FIGS. 4 and 5 that a pair of oppositely disposed arcuate-shaped projections 114 are formed on a face of the cover member 38. A step or shoulder 116 is formed on each projection 114 such that a narrow arcuate-shaped collar-portiion 118 extends outwardly from each projection 114. The radially outer peripheral surfaces 120 of the collar-portions 118 form a diameter which fits closely within the inner peripheral edge of the pump plate 50 when the latter is mounted on the shoulders 116.

After the steel pump plate 50 is thus mounted on the aluminum cover member 38, the latter, but in particular the bimetallic thermostatic valve control element 96 attached thereto, is subjected to an atmosphere maintained at a predetermined temperature, say, 165°–195°F. This may be accomplished by any suitable means, such as placing the cover member 38 horizontally on the uppermost outer portion of a suitable receptacle (not shown) containing a liquid, such as water, maintained at the selected temperature, depending upon the particular model viscous fluid clutch involved, with the bimetallic thermostatic valve control element 96 depending from the underside thereof so as to be completely submerged in the liquid.

Once the bimetallic element 96 was wound or unwound in reaction to the temperature of the liquid bath, the associated valve member 84 will have been rotated accordingly. The loosely mounted pump plate 50 is then manually rotated with respect to the adjacent collar-portions 118 until a predetermined edge 122 of the valve member 84 is lined up across a selected diagonal of the inlet port 82, as illustrated in FIG. 3. The bimetallic element 96 is thus calibrated to selectively open or close the inlet port 82 in response to variable ambient conditions.

While in this calibrated relationship, the arcuate-shaped aluminum collar-portions 118 are forced radially outwardly by any suitable method, such as staking, to thus become deformed by the adjacent notches 112 of the steel pump plate 50, and wedged thereagainst so as to be able to withstand a turning torque of a predetermined force. Thereafter, the cover member and pump plate subassembly is assembled onto the housing 30 containing the rotatable clutch plate 58 in the usual manner.

It should be apparent that the invention provides an improved method of assembling pump plate and cover member components which are formed of dissimilar materials and employed in a viscous fluid clutch.

While but one embodiment of the invention has been shown and described, other modifications thereof are possible.

I claim:

1. A viscous fluid clutch comprising a housing rotatably mounted by bearings on a central shaft, said housing being formed of interconnected body and cover members and having first and second adjacent annular chambers formed therein, a pump plate serving as a divider wall between said first and second chambers, a plurality of closely adjacent notches formed around the inner peripheral edge of said pump plate forming a notched opening therein, a pair of oppositely disposed arcuate-shaped collar-portions formed on said cover member within said notched opening and deformed radially outwardly into mesh with adjacent notches of said notched opening at a predetermined circumferential relationship therewith, a clutch plate mounted on said central shaft in said second chamber, a predetermined shear space intermediate said clutch plate and the adjacent surface of said body member in said first chamber and operable with a fluid medium therein to provide a shear-type fluid drive between said housing and said clutch plate, said pump plate having an outlet opening formed in an outer radial portion thereof and an inlet opening formed at an inner radial portion thereof, pump means formed on said pump plate adjacent said outlet opening to pump said fluid medium from said first chamber through said outlet opening into said second chamber, and a temperature-responsive valve member operatively connected between said cover member and said inlet opening and in a predetermined circumferential relationship with said inlet opening corresponding to said predetermined circumferential relationship between said collar-portions and said notches for controlling the flow of said fluid medium from said second chamber through said inlet opening into said first chamber in response to changes in ambient temperature.

2. A viscous fluid clutch comprising a housing rotatably mounted by bearings on a central shaft, said housing being formed of interconnected body and cover members and having first and second adjacent annular chambers formed therein, a pump plate serving as a divider wall between said first and second chambers, a plurality of closely adjacent notches formed around the inner peripheral edge of said pump plate forming a notched opening therein, a pair of oppositely disposed arcuate-shaped collar-portions formed on said cover member within said notched opening and deformed radially outwardly into mesh with adjacent notches of said notched opening at a predetermined circumferential relationship therewith, a clutch plate mounted on said central shaft in said second chamber, a plurality of annular ridges formed on one of said housing and said clutch plate and a plurality of cooperating annular grooves formed on the other of said housing and said clutch plate in said first chamber, said annular ridges and grooves forming a shear space therebetween and operable with a fluid medium to provide a shear-type fluid drive between said housing and said clutch plate, said pump plate having an outlet opening formed in an outer radial portion thereof and a rectangular inlet opening formed at an inner radial portion thereof, pump means formed on said plate adjacent said outlet opening to pump said fluid medium from said first chamber through said outlet opening into said second chamber, and a temperature-responsive valve member operatively connected between said cover member and said rectangular inlet opening and in a predetermined circumferential relationship with said rectangular inlet opening corresponding to said predetermined circumferential relationship between said collar-portions and said notches for controlling the flow of said fluid medium from said second chamber through said rectangular inlet opening into said first chamber in response to changes in ambient temperature.

3. A method of assembling a viscous fluid clutch cover member and pump plate comprising the following steps:
   a. forming a cover member of a first predetermined material, said cover member including a central opening, oppositely disposed shoulders on a face thereof, and an arcuate-shaped collar-portion on each of said shoulders;
   b. pivotally mounting a center pin in said central opening;
   c. mounting a bimetallic member on said cover member by securing one end thereof to said cover member and the other end thereof to one end of said center pin;
   d. securing a valve member to the other end of said center pin so as to extend radially intermediate said oppositely disposed shoulders;
   e. forming a pump plate of a second dissimilar predetermined material, said pump plate including a central opening and an off-set opening at a predetermined radial location thereon;
   f. forming a plurality of closely adjacent notches around the inner peripheral edge of said central opening in said pump plate;
   g. mounting said pump plate on said shoulders, around said arcuate-shaped collar-portions;
   h. subjecting said bimetallic member to an atmosphere maintained at a predetermined temperature;
   i. rotating said pump plate on said shoulders until said off-set opening is bisected by a predetermined edge of said valve member after said associated bimetallic member is fully responsive to said predetermined temperature; and
   j. staking said arcuate-shaped collar-portions to wedge same into said adjacent notches, thereby securing said pump plate on said cover member.

4. A method of assembling a viscous fluid clutch cover member and pump plate comprising the following steps:
   a. forming a cover member of a first predetermined material, said cover member including a central opening, oppositely disposed projections on a face thereof, an axial shoulder on each projection and an arcuate-shaped collar-portion on the radially inner portion of each of said axial shoulders;
   b. pivotally mounting a center pin in said central opening;
   c. mounting a bimetallic member on said cover member by securing one end thereof to said cover member and the other end thereof to one end of said center pin;
   d. securing a flat leaf spring-like valve member to the other end of said center pin so as to extend radially intermediate said oppositely disposed projections;
   e. forming a pump plate of a second dissimilar predetermined material, said pump plate including a central opening and a rectangular opening at a predetermined radial location thereon;
   f. forming a plurality of closely adjacent notches around the inner peripheral edge of said central opening in said pump plate;
   g. mounting said pump plate on said axial shoulders, around said arcuate-shaped collar-portions;

h. subjecting said bimetallic member to an atmosphere maintained at a predetermined temperature;
i. rotating said pump plate on said axial shoulders until a diagonal of said rectangular opening aligns with a predetermined edge of said valve member after said associated bimetallic member is fully responsive to said predetermined temperature; and
j. staking said arcuate-shaped collar-portions to deform same into the shape of said adjacent notches, thereby securing said pump plate on said cover member.

* * * * *

UNITED STATES PATENT OFFICE
CERTIFICATE OF CORRECTION

PATENT NO. : 3,865,221
DATED : February 11, 1974
INVENTOR(S) : Donald J. Coty

It is certified that error appears in the above-identified patent and that said Letters Patent are hereby corrected as shown below:

FRONT PAGE, after "[45]", the date "Dec. 17, 1974"
should read -- Feb. 11, 1975 --;

in the ABSTRACT, line 3, "material"
should read -- materials --.

Column 1, line 30, "ae" should read -- are --.

Column 3, line 30, "of" (second occurrence) should
read -- or --.

Column 4, line 36, "was" should read -- has --.

Signed and sealed this 13th day of May 1975.

(SEAL)
Attest:

RUTH C. MASON
Attesting Officer

C. MARSHALL DANN
Commissioner of Patents
and Trademarks